(12) United States Patent
Matsushita et al.

(10) Patent No.: US 11,592,981 B2
(45) Date of Patent: Feb. 28, 2023

(54) INFORMATION PROCESSING DEVICE AND PROGRAM

(71) Applicant: Faurecia Clarion Electronics Co., Ltd., Saitama (JP)

(72) Inventors: Yuki Matsushita, Saitama (JP); Takuma Shioguchi, Saitama (JP)

(73) Assignee: Faurecia Clarion Electronics Co., Ltd., Saitama (JP)

( * ) Notice: Subject to any disclaimer, the term of this patent is extended or adjusted under 35 U.S.C. 154(b) by 0 days.

(21) Appl. No.: 17/728,156

(22) Filed: Apr. 25, 2022

(65) Prior Publication Data
US 2022/0350480 A1 Nov. 3, 2022

(30) Foreign Application Priority Data
Apr. 28, 2021 (JP) .............................. JP2021-076668

(51) Int. Cl.
*G06F 3/04883* (2022.01)
*G06F 3/14* (2006.01)
*G06F 3/041* (2006.01)
*G06F 3/04847* (2022.01)

(52) U.S. Cl.
CPC .......... *G06F 3/04883* (2013.01); *G06F 3/041* (2013.01); *G06F 3/14* (2013.01); *G06F 3/04847* (2013.01)

(58) Field of Classification Search
None
See application file for complete search history.

(56) References Cited

U.S. PATENT DOCUMENTS

| 2007/0152984 | A1* | 7/2007 | Ording | G06F 3/04883 345/173 |
| 2010/0275150 | A1* | 10/2010 | Chiba | G06F 3/0488 715/788 |
| 2013/0345883 | A1* | 12/2013 | Sloo | G05B 15/02 700/276 |
| 2015/0379785 | A1* | 12/2015 | Brown, Jr. | G06F 16/245 701/29.1 |

FOREIGN PATENT DOCUMENTS

JP 2012-150849 A 8/2012

\* cited by examiner

*Primary Examiner* — Tuan S Nguyen
(74) *Attorney, Agent, or Firm* — IP Business Solutions, LLC

(57) ABSTRACT

The information processing device includes a display control unit, and an execution instruction issuing unit, wherein the operation detecting unit determining that a second touch operation has been detected when movement has been detected in the touched position on a touch panel detected as a first touch operation, and the execution instruction issuing unit issuing an instruction to execute a process associated with a direction of movement in the touched position moved by the detected second touch operation.

5 Claims, 6 Drawing Sheets

INFORMATION PROCESSING DEVICE AND PROGRAM

CROSS-REFERENCE TO RELATED APPLICATIONS

The present application claims priority under 35 U.S.C. § 119 to Japanese Patent Application No. 2021-076668 filed on Apr. 28, 2021. The content of the application is incorporated herein by reference in its entirety.

BACKGROUND OF THE INVENTION

Field of the Invention

The present invention relates to an information processing device and program.

Description of the Related Art

Some known information processing devices are provided with a touch panel to serve as a receiving unit for receiving user input. Japanese Patent Application Publication No. 2012-150849 discloses an input device for a portable electronic device including a touch panel with an input function based on touching an input surface, a display unit on which the input surface of the touch panel has been placed that can visibly display information related to input operations, and an input control unit that issues a processing instruction for inputted signals based on signals inputted using the touch panel. By displaying buttons as visible information related to input operations on the display unit, this input device enables the touch panel to be operated while viewing visible information in the form of buttons on the touch panel.

However, in order to enter a plurality of commands using touch panel operations, the user has to remember which operations performed using the touch panel are associated with which commands inputted by those operations. Therefore, there is room for improvement from the standpoint of greater convenience.

SUMMARY OF THE INVENTION

In view of this situation, it is an object of the present invention to provide an information processing device and program that improves the operability of operations performed using a touch panel and that improves user convenience.

In order to achieve this purpose, the present invention is an information processing device comprising: an operation detecting unit that detects a first touch operation and a second touch operation different from the first touch operation on a touch panel based on coordinate information indicating a touched position inputted from the touch panel; a display control unit that displays a first screen on the touch panel and that displays a second screen on the touch panel displaying the processing content of a plurality of processes associated with the movement direction in the touched position on the touch panel when a first touch operation is detected by the operation detecting unit; and an execution instruction issuing unit that issues an instruction to execute a process associated with the detected second touch operation when a second touch operation is detected by the operation detecting unit, the operation detecting unit determining that a second touch operation has been detected when movement in the touched position on the touch panel detected as the first touch operation has been detected, and the execution instruction issuing unit issuing an instruction to execute the process among a plurality of processes associated with the direction of movement in the touched position moved by the detected second touch operation.

Effect of the Invention

The present invention is able to improve the operability of operations performed using a touch panel and improve user convenience.

DETAILED DESCRIPTION OF THE INVENTION

Figure 1:
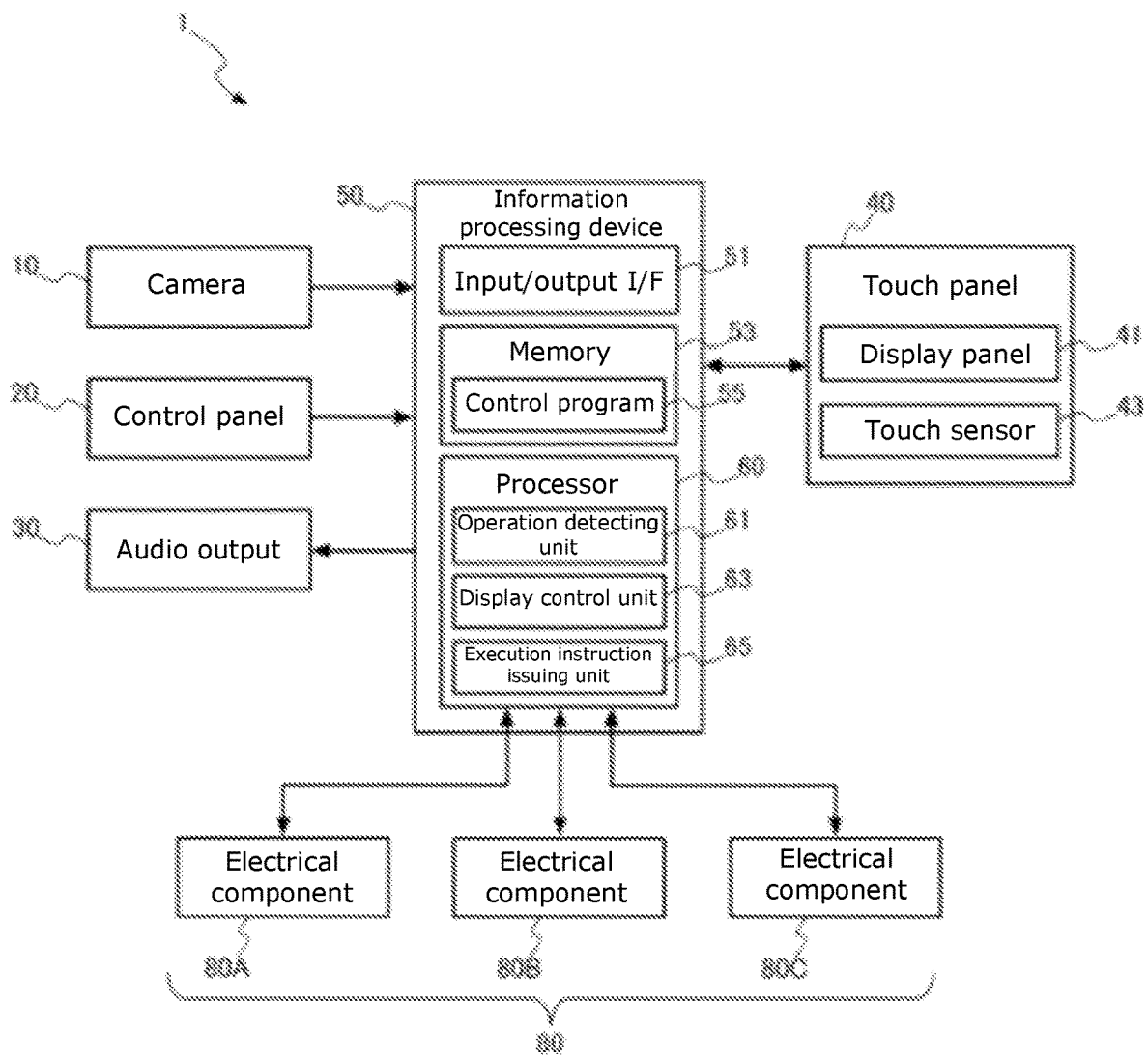
FIG. 1 is a block diagram showing the configuration of the information processing device.

An embodiment of the present invention will now be described with reference to the appended drawings. FIG. 1 is a diagram showing the configuration of the information processing device in the present embodiment. The system 1 shown in FIG. 1 is a system installed in a vehicle equipped with a plurality of electrical components 80. An operation performed by a passenger in the vehicle is received to change the settings of the electrical component 80 corresponding to the received operation based on the received operation. These electrical components 80 are controlled devices. In the present embodiment, the vehicle is a vehicle with the steering wheel on the right.

The system 1 includes a camera 10, a control panel 20, an audio output unit 30, a touch panel 40, and an information processing device 50. The information processing device 50 includes an input/output interface 51, and is connected to electrical components 80 installed in the vehicle via the input/output interface 51. FIG. 1 includes electrical component 80A, electrical component 80B, and electrical component 80C as the electrical components 80. The number of electrical components installed in the vehicle and operated by the information processing device 50 is not limited to three, namely, electrical component 80A, electrical component 80B, and electrical component 80C. In the following description, interface is abbreviated as I/F. Electrical component 80A, electrical component 80B, and electrical component 80C are referred to collectively as the electrical components 80. The information processing device 50 and the electrical components 80 are connected via cables compatible with communication standards such as CAN (Controller Area Network) and Ethernet (registered trademark), and the input/output interface 51 includes a processing circuit and a connector compatible with standards such as CAN and Ethernet.

The camera 10 is mounted in the passenger compartment of the vehicle and captures images of vehicle passengers. The camera 10 is installed at either the left or right side of the windshield or the A-pillar, and captures images of the driver seated in the driver's seat and any passenger seated in the passenger seat. The camera 10 includes an image sensor such as a CCD (charge-coupled device) or CMOS (complementary metal-oxide-semiconductor), and a data processing circuit for generating images from light received by the image sensor. The camera 10 outputs captured images to the information processing device 50.

The control panel 20 functions as a receiving unit that receives operations performed by a passenger. The control panel 20 includes, for example, hardware buttons and switches.

The audio output unit 30 includes a digital-to-analog converter (DAC), an amplifier, and a loudspeaker, and functions as a notification unit that performs notification operations. The DAC, the amplifier and the loudspeaker are not shown. The audio output unit 30 converts digital audio signals inputted from the information processing device 50 into analog signals, amplifies the converted analog signals using the amplifier, and outputs the converted analog signals from the loudspeaker.

The touch panel 40 includes a display panel 41 such as a liquid crystal panel or an organic EL (electro-luminescence) panel, and a touch sensor 43. The touch sensor 43 detects a touch operation performed on the touch panel 40 by a passenger. The touch sensor 43 detects the touched position where the passenger's finger touched the display panel 41, and outputs coordinate information indicating the touched position to the information processing device 50. A coordinate system is established in advance on the display panel 41, and the touch sensor 43 outputs coordinate information indicating the position where the passenger's finger is touching the display panel 41 to the information processing device 50. In the present embodiment, the controller used to operate the touch panel is a passenger finger. However, the controller may also be an indicator such as a pointer.

The information processing device 50 is a computer device including an input/output I/F 51, a memory 53, and a processor 60. The information processing device 50 controls the operations performed by the information processing device 50 in an integrated manner by operating a processor 60 in accordance with a control program 55 stored in the memory 53.

The memory 53 includes semiconductor memory such as RAM (random-access memory) and ROM (read-only memory). The RAM is used to temporarily store different types of data, and the ROM is used to store the control program 55 for controlling the operations performed by the information processing device 50 as well as various settings.

The processor 60 is an arithmetic processing unit composed of a CPU (central processing unit) and an MPU (microprocessing unit). The processor 60 executes the control program 55 to control each component in the information processing device 50. The processor 60 may be configured from a single processor or may be configured using a plurality of processors. The processor 60 may also be configured using some or all of the memory 53 or an SoC (system-on-a-chip) integrated with other circuits. The processor 60 may also be configured from a combination of a CPU that executes a program and a DSP that executes a predetermined arithmetic process. All of the functions of the processor 60 may be implemented using hardware or may be configured using a programmable device.

The information processing device 50 includes an operation detecting unit 61, a display control unit 63, and an execution instruction issuing unit 65 as functional configurations. These functional configurations are functions realized by the processor 60 performing an operation in accordance with the control program 55.

The operation detecting unit 61 detects a touch operation based on coordinate information inputted from the touch panel 40. The operation detecting unit 61 includes a first touch operation and a second touch operation. A first touch operation is an operation in which the passenger brings two fingers into contact with the touch panel 40. The operation detecting unit 61 determines that a first touch operation has been detected when coordinate information for two points has been inputted from the touch panel 40.

A second touch operation is an operation in which the two fingers touching the touch panel 40 in a first touch operation are moved while remaining in touch with the touch panel 40. After detecting a first touch operation, the operation detecting unit 61 determines that a second touch operation has been detected when movement in the coordinate information on the two points is detected from coordinate information inputted from the touch panel 40.

The display control unit 63 generates image data and causes the touch panel 40 to display a menu screen which is an image based on the generated image data. The menu screens displayed on the touch panel 40 by the information processing device 50 includes a first menu screen 100 and a second menu screen 200.

The first menu screen 100 corresponds to the first screen, and the second menu screen 200 corresponds to the second screen.

The execution instruction issuing unit 65 instructs the targeted electrical component 80 to execute the process corresponding to the second touch operation detected by the operation detecting unit 61.

Figure 2:
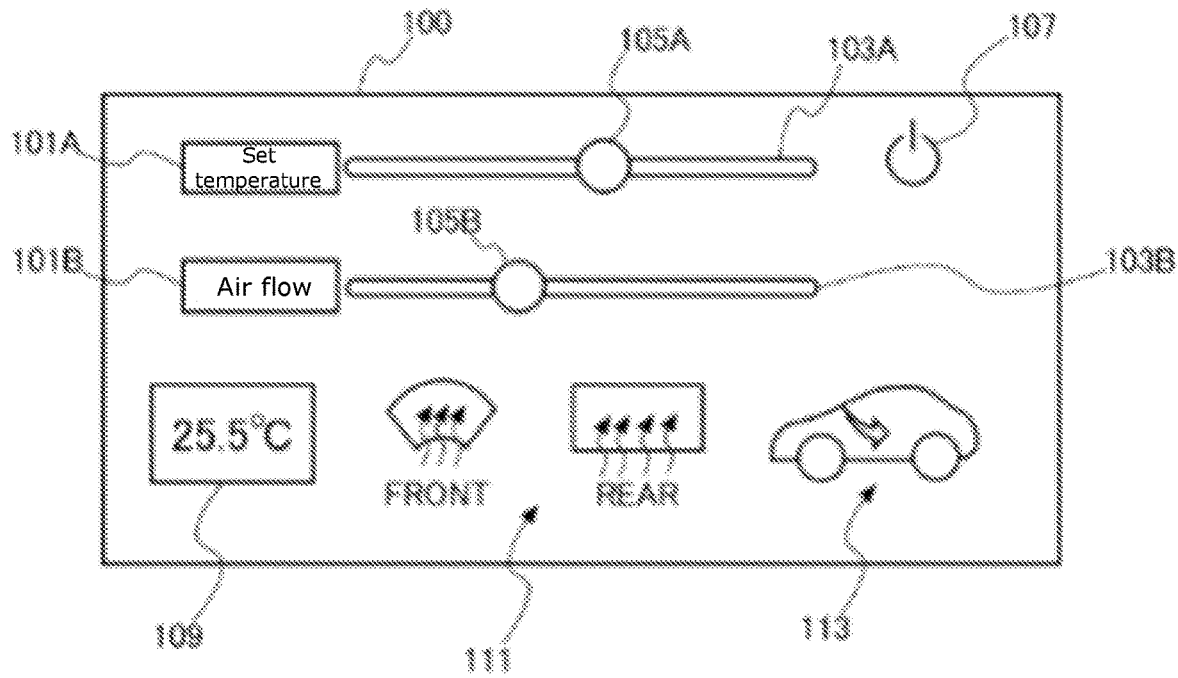
FIG. 2 is a diagram showing an example of the first menu screen.

FIG. 2 is a diagram showing an example of the first menu screen 100. The display control unit 63 causes the touch panel 40 to display the first menu screen 100 when the driver turns the ignition key and the vehicle accessory power is turned on. Because the first menu screen 100 is the screen that is first displayed on the touch panel 40 after the accessory power has been turned on, it is also referred to as the initial screen.

The first menu screen 100 is actually a plurality of screens for each electrical component 80 whose settings can be changed by operating the first menu screen 100. For example, the first menu screen 100 can have a first menu screen 100 for changing the settings of the air conditioner, a first menu screen 100 for changing the setting of the audio equipment, and a first menu screen 100 for changing the settings of the navigation device. Other electrical components 80 whose settings can be changed by operating the first menu screen 100 include electric seats and the touch panel 40 itself. The traveling mode of the vehicle may also be changed by the first menu screen 100. Traveling modes include an eco mode that emphasizes low fuel consumption, a sports mode that emphasizes acceleration, and a normal mode between eco mode and sports mode. Display of the first menu screen 100, that is, the electrical component 80 whose settings can be changed by operating the first menu screen 100 can be changed by operating a switch or button on the control panel 20.

FIG. 2 is a diagram showing a first menu screen 100 for changing the settings of the air conditioner. The first menu screen 100 for operating the settings of the air conditioner can include a display for changing the air flow outputted from the air conditioner and a display for changing the temperature setting of the air conditioner. The first menu screen 100 for changing the settings of the air conditioner can include a button 107 for switching power to the air conditioner ON and OFF, display 109 of the set temperature for the air conditioner, display 111 of air outlets from the air conditioner that are open, and a button 113 to switch between circulating cabin air and introducing outside air. The first menu screen 100 for operating the settings of the audio equipment can display a music selection button, a volume adjustment button, and a radio channel selection button.

Operations and the controllers used to perform the operations can also be displayed on the first menu screen 100. Controllers include buttons, switches, slider bars, and sliders. The first menu screen 100 for changing the settings of the air conditioner shown in FIG. 2 can display the set temperature 101A for the air conditioner and the air flow 101B. A slider bar 103A and a slider 105A are displayed as the controllers for changing the set temperature 101A, and a slider bar 103B and a slider 105B are displayed as the controllers for changing the air flow 101B.

Figure 3:
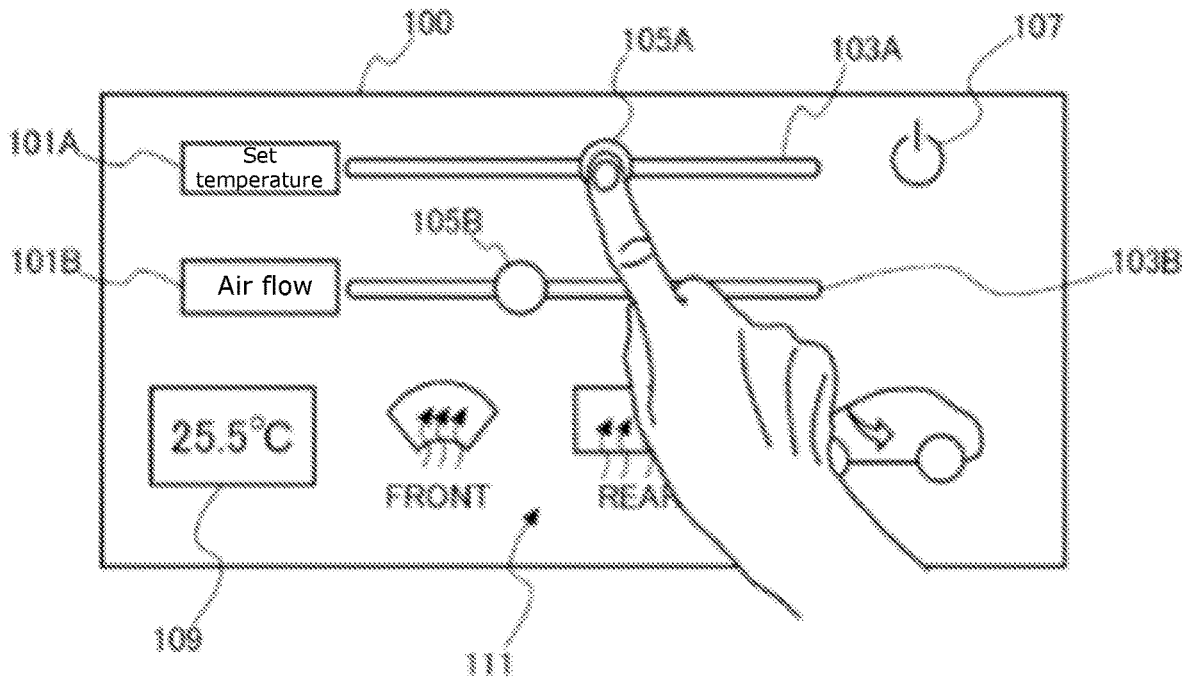
FIG. 3 is a diagram showing the method used to manipulate the first menu screen using touch operations.

FIG. 3 is a diagram showing the method used to operate the first menu screen 100 using touch operations. When a passenger changes the settings for an operation on the first menu screen 100, the passenger places one finger on the display position of the slider 105A, 105B of the setting the passenger wishes to change, and moves the touching finger left or right along the slider bar 103A, 103B. The display control unit 63 changes the display position of the slider 105A, 105B to the coordinates indicated by the coordinate information inputted from the touch panel 40. When the execution instruction issuing unit 65 has detected that the finger touching the touch panel 40 has left the touch panel 40, it outputs set temperature and air flow setting change instructions to the air conditioner based on the position on the slider 105A, 105B where the finger was released.

Figure 4:
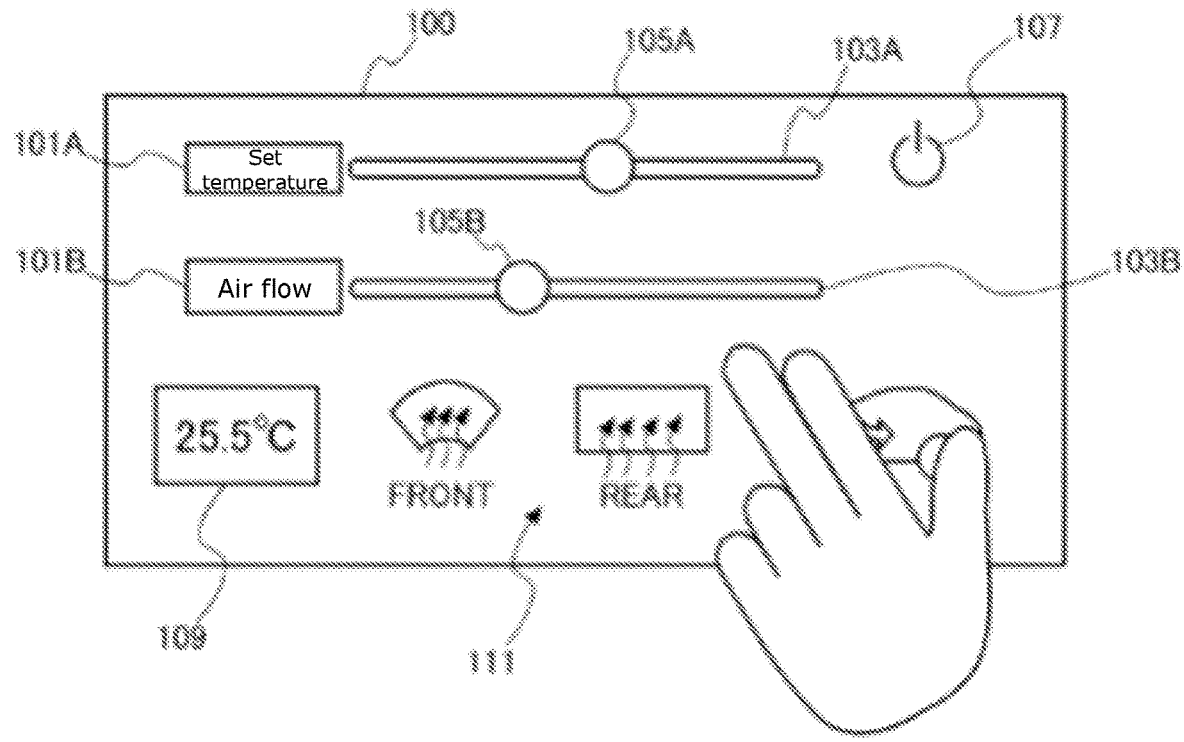
FIG. 4 is a diagram showing a first touch operation being performed on the first menu screen.

FIG. 4 is a diagram showing a first touch operation for the first menu screen 100. The operation detecting unit 61 determines that a first touch operation has been detected when coordinate information on two points indicating touched positions is inputted from the touch panel 40. When the operation detecting unit 61 has detected a first touch operation, the display control unit 63 changes the display on the touch panel 40 from the first menu screen 100 to a second menu screen 200.

Figure 5:
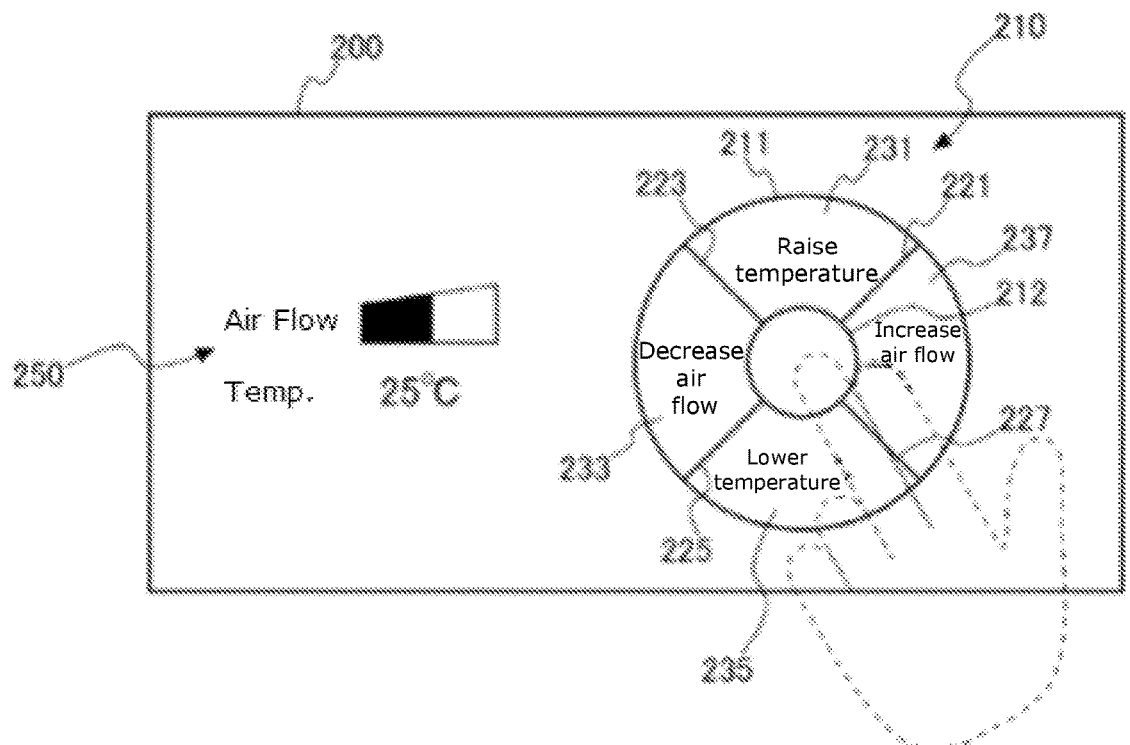
FIG. 5 is a diagram showing an example of the second menu screen.

FIG. 5 is a diagram showing an example of a second menu screen 200. When a passenger performs the first touch operation of touching the touch panel 40 with two fingers, the display on the touch panel 40 is changed from the first menu screen 100 to a second menu screen 200. The second menu screen 200 includes a control image 210 and associated information 250. The display control unit 63 displays the control image 210 with reference to the coordinates on the touch panel 40 detected as a first touch operation.

The control image 210 includes a large circle image 211 and a small circle image 212 with different radii. The center of the small circle image 212 with a small radius coincides with the center of the large circle image 211 with a large radius. The large circle image 211 and the small circle image 212 are divided into a first region 231, a second region 233, a third region 235, and a fourth region 237 by line segments 221, 223, 225, and 227. When the coordinates of two points have been detected as a first touch operation, the display control unit 63 displays the control image 210 so that the center of the large circle image 211 and the small circle image 212 is located substantially at the center of the coordinates for these two points or near the coordinates for the two points.

When angle θ from the center of the large circle image 211 and the small circle image 212 to the right in the horizontal direction is set as a reference direction of 0°, the first region 231 is the range in which the angle θ is 45° or more and less than 135°, the second region 233 is the range in which the angle is 135° or more and less than 225°, the third region 235 is the range in which the angle is 225° or more and less than 315°, and the fourth region 237 is the range in which the angle is 315° or more and less than 45°. FIG. 5 shows a control image 210 having four regions from a first region 231 to a fourth region 237, but the number of regions is not limited to four, and may be two or more. Also, FIG. 4 shows a circular control image 210 with a large circle image 211 and a small circle image 212, but the shape of the control image 210 may be polygonal.

The first region 231 and the third region 235 are arranged to face each other and have the same control item, and the second region 233 and the fourth region 237 are arranged to face each other and have the same control item. In the present embodiment, the first region 231 and the third region 235 are used to change the set temperature of the air conditioner, and the second region 233 and the fourth region 237 are used to change the air flow from the air conditioner. Also, the first region 231 is used to raise the set temperature of the air conditioner, and the third region 235 is used to lower the set temperature of the air conditioner. The second region 233 is used to lower the air flow from the air conditioner, and the fourth region 237 is set to increase the air flow from the air conditioner. The operation that can be performed is displayed for each of the regions, from the first region 231 to the fourth region 237. "Temperature UP" is displayed in the first region 231 and "Temperature DOWN" is displayed in the third region 235. "Air Flow DOWN" is displayed in the second region 233, and "Air Flow UP" is displayed in the fourth region 237.

When displaying a control image 210 on the touch panel 40, the display control unit 63 generates range information indicating the range of each region 231 to 237 in the control image 210. The display control unit 63 generates range information based on the coordinate information from the first touch operation and segment information for each of the divided preset regions 231 to 237. The section information has information on the angle from the reference direction and information on the distance. The distance information is information that defines distances from the reference point, which are the coordinates of the first touch operation, on the radius of the large circle image 211. Angle information is information on the angle range of each region from the reference direction centered on the coordinates of the first touch operation. In the present embodiment, when angle θ=0° from the center to the horizontal right is set as the reference direction, the first region 231 is information that the central angle θ is 45° or more and less than 135°. The second region 231 is information that the central angle θ is 135° or more and less than 225°. The third region 235 is information that the central angle θ is 225° or more and less than 315°. The fourth region 237 is information that the central angle θ is 315° or more and less than 45°.

The relationship between the first menu screen 100 and the control items set in regions 231 to 237 of the control image 210 will now be described. In the present embodiment, control items related to the first menu screen 100 are displayed in each region of the control image 210. In other words, the control item displayed for changing the settings of an electrical component 80 is for the same electrical component 80 whose settings can be changed by operating the first menu screen 100. For example, when the first menu screen 100 is a screen for changing the settings of the air conditioner, the control image 210 displays control items for changing the settings of the air conditioner.

Control images 210 with preset control items unrelated to the first menu screen 100 may also be displayed. For example, when the first menu screen 100 is a screen for changing the reclining angle of a seat, a control image 210 with control items for changing the temperature and the air flow of the air conditioner may also be displayed.

Figure 6:
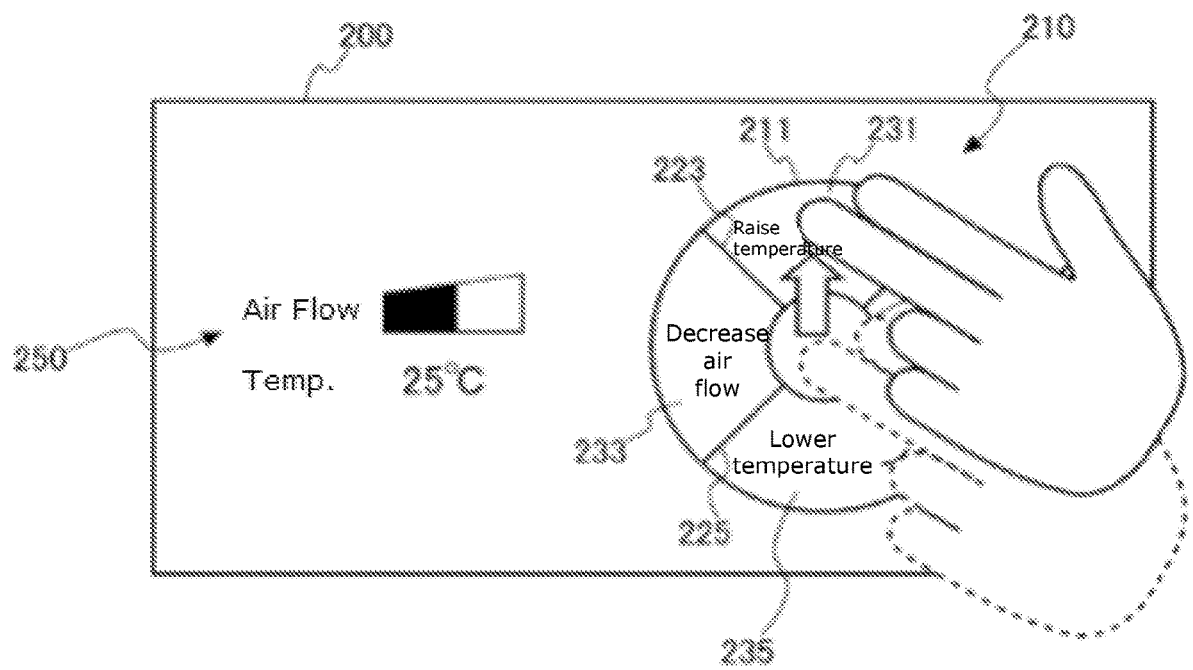
FIG. 6 is a diagram showing a second touch operation being performed on the second menu screen.

FIG. 6 is a diagram showing a second touch operation being performed on the second menu screen. While the two fingers placed on the touch panel 40 in the first touch operation remain in touch with the touch panel 40, the passenger moves the fingers to the control item to be activated in the direction of the associated area from the position of the small circle image 212. For example, when raising the set temperature, the passenger moves the two fingers in the direction of the first region 231.

The operation detecting unit 61 determines the region 231 to 237 to which the two fingers have been moved based on the range information generated when the control image 210 is displayed on the second menu screen 200. The execution instruction issuing unit 65 instructs the targeted electrical component 80 to execute the process associated with the control item set in regions 231 to 237 as determined by the operation detecting unit 61. For example, when the operation detecting unit 61 determines that the two fingers have moved to the first region 231, it raises the set temperature of the air conditioner by a preset temperature. The operation detecting unit 61 may, for example, calculate the center coordinates between the coordinates of the two points inputted from the touch panel 40 to determine the region 231 to 237 to which the calculated coordinates have moved.

When the passenger wishes to continue the operation, for example, to raise the set temperature of the air conditioner even further, the passenger keeps the two fingers moved to the first region 231 in the first region 231 without releasing the touch panel 40. When the input of coordinates from the touch sensor 43 continues, the information processing device 50 keeps raising the temperature of the air conditioner by a preset temperature increment every time a certain period of time elapses.

Associated information 250 is also displayed on the second menu screen 200. For example, when the control target of a control image 210 is an air conditioner, information such as the set temperature and the air flow is displayed as associated information 250. The display position of the associated information 250 is preferably a position that does not overlap with the control image 210 and that is easily visible to the passenger operating the control image 210.

For example, the regions of the touch panel 40 seen from the passenger may be divided into three regions, a left region, a right region, and a central region. When the passenger touches the left region of the touch panel 40 with two fingers, the control image 210 is displayed in the left region centered on the coordinates where contact with two fingers was detected, and the associated information 250 is displayed in the right region. When the passenger touches the right region of the touch panel 40 with two fingers, the control image 210 is displayed in the right region centered on the coordinates where contact with two fingers was detected, and the associated information 250 is displayed in the left region.

When displaying associated information 250, the information processing device 50 analyzes images captured by the camera 10 and operates the touch panel 40 based on whether a passenger sitting in the passenger seat or the driver sitting in the driver's seat is operating the device. When it has been determined that the passenger in the passenger seat is operating the touch panel 40 and the central area of the touch panel 40 is touched, the information processing device 50 displays the associated information 250 in the right area of the touch panel 40 on the driver side. When it has been determined that the driver in the driver's seat is operating the touch panel 40 and the central area of the touch panel 40 is touched, the information processing device 50 displays the associated information 250 in the left area of the touch panel 40 on the passenger side. This keeps the information displayed on the touch panel 40 from being concealed by a hand during operation. When the central area of the touch panel 40 is divided into two parts, an upper part and a lower part, and coordinates in the upper central area of the touch panel 40 are detected as the coordinates indicating the touched position, the associated information 250 may be displayed in the lower central area. When coordinates in the lower central area of the touch panel 40 are detected as the coordinates indicating the touched position, the associated information 250 may be displayed in the upper central area.

Figure 7:
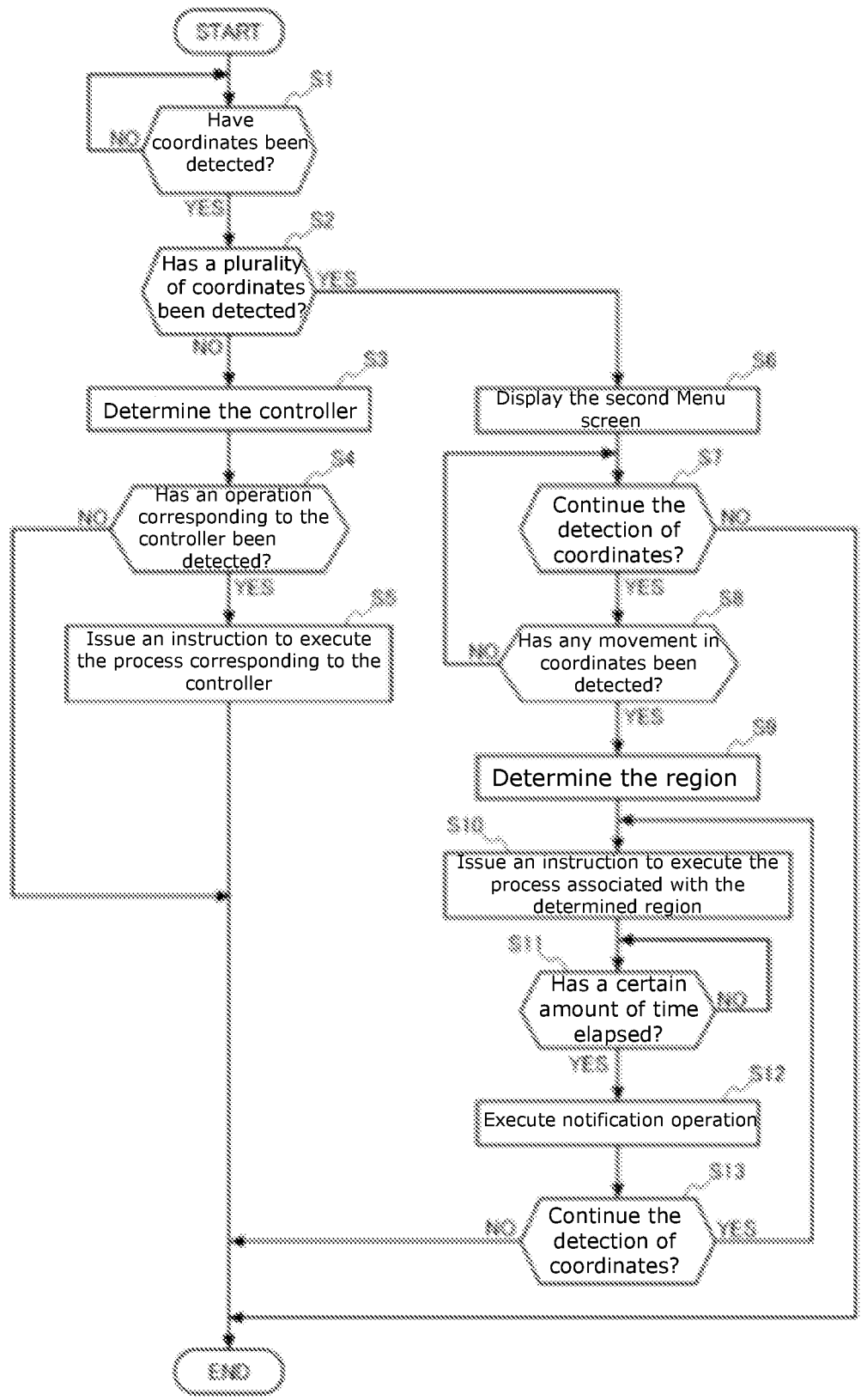
FIG. 7 is a flowchart showing operations performed by the information processing device.

FIG. 7 is a flowchart showing operations performed by the information processing device 50. The operations performed by the information processing device 50 will be explained with reference to the flowchart in FIG. 7. First, the information processing device 50 determines whether or not coordinates from a touch operation have been detected (step S1). When coordinates from a touch operation have not been detected (step S1/NO), the information processing device 50 does not advance to the next step until coordinates from a touch operation have been detected.

When coordinates have been detected (step S1/YES), the information processing device 50 determines whether or not more than one set of coordinates has been detected (step S2). Step S1 and step S2 correspond to the detection step in the claims. When a single set of coordinates has been detected (step S2/YES), the information processing device 50 determines that a controller is being displayed at the position of the detected coordinates (step S3). When the information processing device 50 determines that the coordinates are those of a controller, it determines whether or not an operation corresponding to the controller has been detected (step S4). For example, when the controller is a slider and a slider bar, the information processing device 50 determines whether or not an operation of moving the slider in the vertical direction or the horizontal direction has been detected. When the controller is a switch or a button, the information processing device 50 determines whether or not coordinates included in the display position of the switch or button have been continuously detected for a certain period of time.

When an operation corresponding to the controller has been detected (step S4), the information processing device 50 issues an instruction to execute the process corresponding to the detected operation on the electrical component 80 to be controlled (step S5). For example, when the electrical component 80 to be controlled on the first menu screen 100 is an air conditioner and the controller has been determined to be the slider bar and slider for setting the temperature in step S4, the information processing device 50 changes the temperature setting of the air conditioner according to the extent of the operation received by operating the slider.

When the number of detected sets of coordinates is a plurality of detected sets of coordinates (step S2/YES), the information processing device 50 causes the touch panel 40 to display a second menu screen 200 (step S6). A control image 210 and associated information 250 are displayed on the second menu screen 200. Step S6 corresponds to the display step in the claims. Next, the information processing device 50 determines whether or not the coordinate information indicating the touched position has been continuously detected (step S7). The coordinate information has not been continuously detected (step S7/NO), the information processing device 50 ends the processing flow.

When detection of the coordinate information has been continuous (step S7/YES), the information processing device 50 determines whether or not the movement in the coordinates has been detected based on the detected coordinate information (step S8). When movement in the coordinates has not been detected (step S8/NO), the information processing device 50 returns to step S7 to determines whether or not the detection of the coordinate information is continuing. When movement in the coordinates has been detected (step S8/YES), the information processing device 50 determines whether or not the moved coordinates are in any of the regions 231 to 237 provided in the control image 210 (step S9). Steps S7 to S9 correspond to the detection step in the claims.

When it has been determined that regions 231 to 237 contain the coordinate information, the information processing device 50 outputs a process execution instruction corresponding to the operation indicated by the detected region 231 to 237 to the electrical component 80 to be controlled (step S10). Step S10 corresponds to the instruction issuing step in the claims. For example, when the determined region 231 to 237 is associated with the operation for increasing the temperature setting, the information processing device 50 increases the set temperature of the air conditioner by a preset temperature increment.

Next, the information processing device 50 determines whether or not a certain amount of time has elapsed since the process in step S10 was executed (step S11). When a certain amount of time has not elapsed (step S11/NO), the information processing device 50 goes into standby to start the processing until the certain amount of time has elapsed. When a certain amount of time has elapsed (step S11/YES), the information processing device 50 outputs a notification sound from the audio output unit 30, and performs the processing corresponding to the operation established for the determined region 231 to 237 once again.

Modification Example 1

As a modification of the embodiment described above, a touch panel 40 capable of detecting pressing operations is used as the touch panel 40. In the embodiment described above, the information processing device 50 changes the display of the touch panel 40 from the first menu screen 100 to a second menu screen 200 when the coordinates of two points corresponding to two fingers are detected. However, it may change the display of the touch panel 40 from the first menu screen 100 to a second menu screen 200 when a pressing operation applied to the touch panel 40 is detected. This pressing operation may be performed with one finger instead of two.

Modification Example 2

A flick operation may be used as the second touch operation. In the embodiment described above, when movement in the coordinates is detected, the information processing device 50 determines whether or not the moved coordinates are within any of the regions 231 to 237 provided in the control image 210, and issues an instruction to execute the process associated with the determined region in the targeted electrical component 80. If a flick operation is detected as the second touch operation, the information processing device 50 determines the region 231 to 237 in the direction of the detected flick operation, and issues an instruction to the targeted electrical component 80 to execute the process associated with the determined region. For example, when the fingers have moved into the first region 231 and a flicking operation made with the two fingers in the direction of the first region 231 has been detected, the set temperature of the air conditioner is raised. For example, when the moving of two fingers into the first region 231 has been detected, the set temperature of the air conditioner can be raised by an increment of 1 degree. When a flick operation is detected, the set temperature of the air conditioner can be raised by an increment that is lower than that when two fingers are moved into the first region 231, for example, 0.5 degrees. These operations can be the same not only for the first region 231 but also for the second region 233, the third region 235, and the fourth region 237.

Modification Example 3

Figure 8:
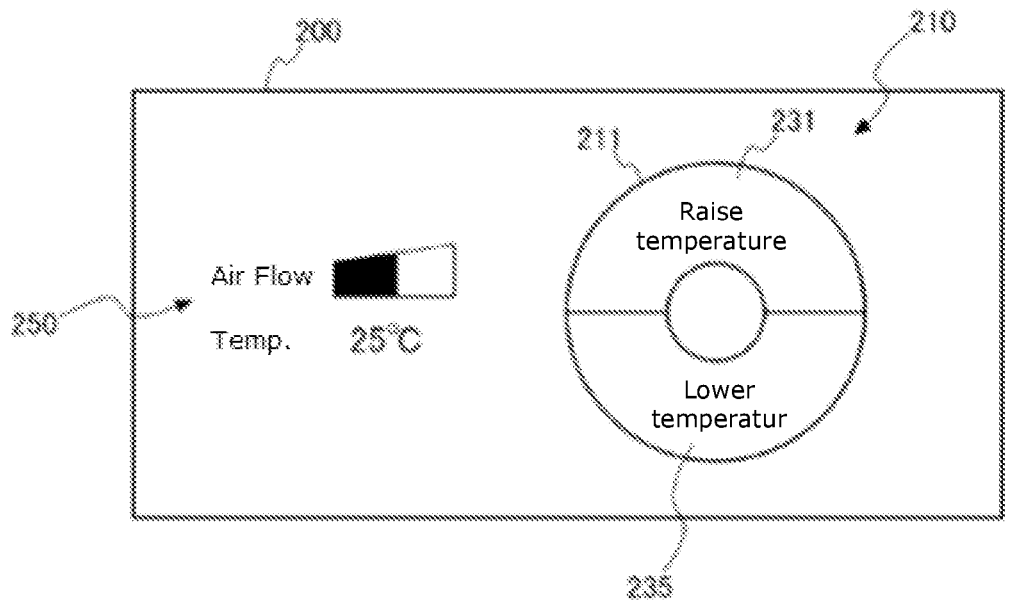
FIG. 8 is a diagram showing another example of the second menu screen.

When an operation to change the setting of an electrical component 80 has been selected, only operations to change the same function as that of the electrical component 80 changed by this operation can be accepted while disabling other functions. At this time, the display of control image 210 whose operations have been disabled may be eliminated from the second menu screen 200. For example, when the operation selected by a passenger is an operation to raise or lower the temperature of the air conditioner, the information processing device 50 accepts only operations that raise or lower the temperature of the air conditioner. When the operation selected by a passenger is an operation to raise or lower the air flow of the air conditioner, the information processing device 50 accepts only operations that raise or lower the air flow of the air conditioner. At this time, the information processing device 50 may change how the control image 210 is displayed. For example, until an operation to change a setting of an electrical component 80 has been selected, the four regions 231 to 237 are displayed in FIG. 5. After an operation to change a setting has been selected, the control image 210 is divided into two regions. FIG. 8 shows an example in which the image has been divided into two regions, the first region 231 and the third region 235.

Figure 9:
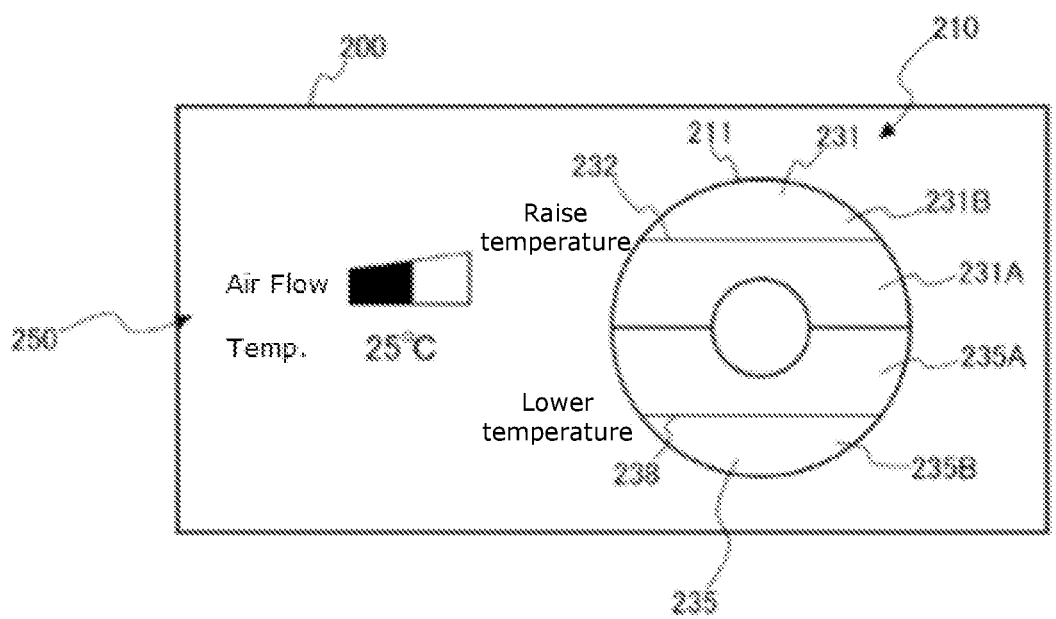
FIG. 9 is a diagram showing yet another example of the second menu screen.

When a control image 210 is divided into two as shown in FIG. 9, the divided region may be further divided based on threshold values. In FIG. 9, the first region 231 is divided further into a lower first region 231A and an upper first region 231B based on a first threshold value 232, and the third region 235 is divided further into an upper third region 235A and a lower first region 235B based on a second threshold value 238. The set temperature is raised using first region 231A and first region 231B. For example, when the coordinates of two fingers are detected in first region 231A, the set temperature of the air conditioner is raised by 0.5 degrees, and when the coordinates of two fingers are detected in first region 231B, the set temperature of the air conditioner is raised by 1 degree. The set temperature is lowered using third region 235A and third region 235B. For example, when the coordinates of two fingers are detected in third region 235A, the set temperature of the air conditioner is lowered by 0.5 degrees, and when the coordinates of two fingers are detected in third region 235B, the set temperature of the air conditioner is lowered by 1 degree.

Modification Example 4

In the embodiment described above, only one of the control items displayed on the second menu screen 200 can be selected. When selecting yet another control item, the two fingers touching the touch panel 40 have to be temporarily removed from the touch panel 40. In the fourth modification example, the plurality of control items displayed on the second menu screen 200 may be selected while keeping two fingers in contact with the touch panel 40.

Each time movement in the coordinates is detected based on a second touch operation, the information processing device 50 generates range information that divides the first region 231, the second region 233, the third region 235, and the fourth region 237 using the coordinates after movement as a reference point. Once range information indicating the range of each region 231 to 237 in the control image 210 has been generated, the information processing device 50 determines the region 231 into 237 to which the two fingers have moved. The information processing device 50 then issues an instruction to the targeted electrical component 80 to execute the process corresponding to the control item in the determined region 231 to 237.

Modification Example 5

The fifth modification example allows coordinates to be reset to the initial coordinates. In the fifth modification example, movement in the coordinates of the touch operation are detected, the region 231 to 237 including the moved coordinates is determined, and the targeted electrical component 80 is instructed to execute the process associated with the determined region 231 to 237. Afterwards, when it has been detected that a passenger has pressed a finger against the touch panel 40 or released one of two fingers from the touch panel 40, the first region 231 to fourth region 237 can be reset using the point at which the pressing operation was detected or the coordinates where one of the two fingers disappeared as the initial coordinates. Then, when movement in the coordinates is detected, the information processing device 50 determines once again the region 231 to 237 to which the detected coordinates belong.

In the embodiments described above, the information processing device 50 includes a touch panel 40, an operation detecting unit 61, a display control unit 63, and an execution instruction issuing unit 65. The operation detecting unit 61 detects a first touch operation and a second touch operation different from the first touch operation on the touch panel 40. The display control unit 63 displays a first menu screen 100 on the touch panel 40. When the first touch operation is detected by the operation detecting unit 61, the display control unit 63 displays a second menu screen 200, which displays the processing content of a plurality of processes associated with the direction in which the touched position moves on the touch panel 40. When the operation detecting unit 61 has detected a second touch operation, the execution instruction issuing unit 65 issues an instruction to execute the process associated with the detected second touch operation. When the movement in a touched position on the touch panel 40 determined to be a first touch operation has been detected, the operation detecting unit 61 determines that a second touch operation has been detected. The execution instruction issuing unit 65 issues an instruction to execute the process associated with the direction in which the touched position is moved by the detected second touch operation. Therefore, when a first touch operation has been detected, the information processing device 50 displays on the touch panel 40 a second menu screen 200, which displays the processing content of a plurality of processes associated with the direction of movement in the touched position on the touch panel 40. As a result, the user can perform a second touch operation while looking at the second menu screen 200, which improves the operability of operations using the touch panel and improves user convenience.

The display control unit 63 displays the second menu screen 200 centered on the touched position on the touch panel 40 detected as a first touch operation. A plurality of processing details are displayed on the second menu screen 200 in a plurality of directions centered on the touched position detected as a first touch operation. As a result, the user can get the information processing device 50 to execute a process by moving the touched position in a second touch operation in the direction of the process the user wishes to be executed on the second menu screen 200.

The operation detecting unit 61 determines that a first touch operation has been detected when a plurality of positions on the touch panel 40 have been detected as touch positions. As a result, the information processing device 50 can distinguish between a touch operation for the first menu screen 100 and a first touch operation for displaying a second menu screen 200.

The operation detecting unit 61 determines that a first touch operation has been detected when a pressing operation against the touch panel 40 has been detected. As a result, the information processing device 50 can distinguish between a touch operation for the first menu screen 100 and a first touch operation for displaying a second menu screen 200.

The display control unit 63 displays some of the processing that can be accepted on the first menu screen 100 on a second screen. As a result, by registering frequently performed operations on the first menu screen 100 as the operation performed on a second menu screen 200, frequently performed operations can be easily inputted using a second touch operation.

The display control unit 63 displays the content of the preset processing on a second screen. As a result, by registering frequently performed operations on a second menu screen 200, frequently performed operations can be easily inputted using a second touch operation.

When the operation detecting unit 61 has detected that a touched position has been moved by a second touch operation after executing the process associated with the direction of movement in the touched position, the operation detecting unit 61 executes the process associated with the direction of movement in the touched position even after a preset amount of time has elapsed. As a result, the information processing device 50 can execute the selected process once again when the user holds a touched position moved by a second touch operation still.

The embodiments described above are just examples of embodiments of the present invention. Various modifications and applications can be realized without departing from the spirit and scope of the present invention.

In the embodiments described above, the control target of the second menu screen 200 is an air conditioner. However, the electrical component 80 controlled by the second menu screen 200 is not limited to be an air conditioner. It can be audio equipment, an electric seat, or a navigation system.

The traveling mode of the vehicle can also be changed by operating a second menu screen 200.

The functional blocks of the information processing device 50 in FIG. 1 show functions of the information processing device 50 classified according to the primary processes, but these processes may be divided further into more blocks. The processing for each block may be executed by a single hardware device or by a plurality of hardware devices. The processing for each block may also be executed by a single software program or by a plurality of software programs.

In order to make the processing performed by the information processing device 50 easier to understand, the processing units in the flowchart shown in FIG. 7 were divided according to primary processes. However, in the present invention, there are no particular restrictions on the method used to divide processing units and the names assigned to them. The processing performed by the information processing device 50 can be further divided into even more processing units, and each processing unit can also be divided to include more processing. In addition, the order in which the processing is performed is not limited to the order shown in the flowchart.

KEY TO THE DRAWINGS

1: System
10: Camera
20: Control panel
30: Audio output unit
40: Touch panel
43: Touch sensor
50: Information processing device
51: I/O interface
53: Memory
55: Control program
60: Processor
61: Operation detecting unit
65: Execution instruction issuing unit
80: Electrical components
80A: Electrical component
80B: Electrical component
80C: Electrical component
100: First menu screen
101A: Set temperature
101B: Air flow
103A, 103B: Slider bar
105A, 105B: Slider
107, 113: Button
110: First menu screen
200: Second menu screen
210: Control image
211: Large circle image
212: Small circle image
221, 223, 225, 227: Line segment
231: First region
233: Second region
235: Third region
237: Fourth region
250: Associated information

What is claimed is:

1. An information processing device connected to a touch panel comprising:
   a processor;
   a non-volatile storage device storing a control program; and
   a temporary memory used by the processor for temporarily storing processing data,
   wherein the processor, by executing the control program,
   detects a first touch operation and a second touch operation on the touch panel based on coordinate information indicating a touched position inputted from the touch panel, wherein in the first touch operation, two fingers of a user contact on the touch panel, and in the second touch operation different from the first touch operation, the two fingers of the user touched on the touch panel move while keeping the two fingers on a touch panel,
   displays a first screen, in which control items including a first control item and a second control item, and controllers including buttons, switches, or sliders to control the control items by one finger of the user are displayed, on the touch panel after a power is turned on, and displays a second screen, in which as a reference point substantially at a center of coordinates of two contact points of the two fingers or one of the coordinates of the two contact points, a circle graphic or a polygonal graphic around the reference point as a center is displayed, on the touch panel when the first touch operation is detected; and
   wherein an angle θ from the reference point of the circle graphic or the polygonal graphic to a horizontal direction is set as a reference direction of 0°, a plurality of regions is divided by a plurality of center angle lines as a boundary, a processing content of a plurality of processes of the control items, which control same functions of the control items displayed on the first screen, is associated with each of the regions, and one of the regions arranged to face each other with respect to the reference point is set as a region of the first control item to increase a predetermined amount and another one of the regions arranged to face each other is set as a region of the second control item to decrease a predetermined amount, and
   wherein when the second touch operation has been detected, the processor issues an instruction to execute a process in response to the first control item or the second control item associated with one of the regions in the direction of movement in the touched position moved by the detected second touch operation.

2. The information processing device according to claim 1, wherein the processor causes the second screen to display the processing content of some of the processes that can be received on the second screen among the processes that can be received on the first screen.

3. The information processing device according to claim 1, wherein the processor causes the second screen to display the processing content of a preset process received by the second screen.

4. The information processing device according to claim 1, wherein the processor re-executes the processing associated with the direction of movement in the touched position when the processor detects that the user still holds the touched position moved by the second touch operation even after a preset amount of time has elapsed after execution of the process associated with the direction of movement in the touched position.

5. A non-transitory computer-readable recording medium for a system including an information processing device and a touch panel, and the information processing device having a processor, a non-volatile storage device storing a control program, and a temporary memory used by the processor for temporarily storing processing data, the system including the information processing device comprising:

detecting a first touch operation and a second touch operation on the touch panel based on coordinate information indicating a touched position inputted from the touch panel, wherein in the first touch operation, contacting two fingers of a user on the touch panel, and in the second touch operation different from the first touch operation, moving the two fingers of the user touched on the touch panel while keeping the two fingers on a touch panel; and displaying a first screen, in which control items including a first control item and a second control item, and controllers including buttons, switches, or sliders to control the control items by one finger of the user are displayed, on the touch panel after a power is turned on, and displaying a second screen, in which as a reference point substantially at a center of coordinates of two contact points of the two fingers or one of the coordinates of the two contact points, a circle graphic or a polygonal graphic around the reference point as a center is displayed, on the touch panel when the first touch operation is detected, wherein an angle $\theta$ from the reference point of the circle graphic or the polygonal graphic to a horizontal direction is set as a reference direction of 0°, a plurality of regions is divided by a plurality of center angle lines as a boundary, a processing content of a plurality of processes of the control items, which control same functions of the control items displayed on the first screen, is associated with each of the regions, and one of the regions arranged to face each other with respect to the reference point is set as a region of the first control item to increase a predetermined amount and another one of the regions arranged to face each other is set as a region of the second control item to decrease a predetermined amount, and wherein when the second touch operation has been detected in the detection step, an instruction is issued to execute a process in response to the first control item or the second control item associated with one of the regions in the direction of movement in the touched position moved from the reference point by the detected second touch operation.

\* \* \* \* \*